(12) United States Patent
Ford et al.

(10) Patent No.: US 6,704,130 B1
(45) Date of Patent: Mar. 9, 2004

(54) ELECTROMECHANICAL OPTICAL MODULATOR PROVIDING STRAY LIGHT CONTROL

(75) Inventors: Joseph Earl Ford, Oakhurst, NJ (US); John VanAtta Gates, II, New Providence, NJ (US); Gerard Edmond Henein, Chatham, NJ (US); David Andrew Ramsey, Annandale, NJ (US); James Albert Walker, Howell, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/415,581

(22) Filed: Oct. 8, 1999

(51) Int. Cl.[7] .......................... G02B 27/10; G02B 6/12; H01S 3/10; G01B 9/02
(52) U.S. Cl. ..................... 359/245; 372/20; 385/14; 356/519
(58) Field of Search ................. 359/291, 290, 359/245, 318, 302, 263, 230, 237, 132, 260; 372/20, 32, 26, 18, 25, 50; 385/14, 16, 24; 356/519, 454, 345, 38

(56) References Cited

U.S. PATENT DOCUMENTS

| 5,500,761 | A | | 3/1996 | Goosen et al. ............... 359/290 |
| 5,943,155 | A | * | 8/1999 | Goossen ..................... 359/247 |
| 6,271,052 | B1 | * | 8/2001 | Miller et al. .................. 438/50 |
| 6,356,254 | B1 | * | 3/2002 | Kimura ....................... 345/108 |
| 6,424,450 | B1 | * | 7/2002 | Goossen ..................... 359/290 |
| 2001/0050707 | A1 | * | 12/2001 | Sasaki et al. ................ 347/255 |
| 2002/0075483 | A1 | * | 6/2002 | Harris et al. ................. 356/453 |
| 2002/0106871 | A1 | * | 8/2002 | Le et al. ..................... 438/465 |
| 2002/0126726 | A1 | * | 9/2002 | Flanders et al. ............. 372/107 |
| 2002/0131458 | A1 | * | 9/2002 | Sirbu et al. .................... 372/20 |

* cited by examiner

Primary Examiner—Georgia Epps
Assistant Examiner—Omar Hindi
(74) Attorney, Agent, or Firm—Lowenstein Sandler PC

(57) ABSTRACT

In accordance with the invention, a electromechanical optical modulator comprising an optical membrane, a substrate and Fabry-Perot air gap between them is provided with an improved structure for controlling light transmitted into the substrate. Specifically, an etched and coated cavity is formed in the backwall of the substrate underlying the air gap to receive transmitted light and redirect it onto controllable paths within the substrate. Advantageously the substrate is silicon, and the cavity is produced by anisotropic etching.

5 Claims, 2 Drawing Sheets

ELECTROMECHANICAL OPTICAL MODULATOR PROVIDING STRAY LIGHT CONTROL

FIELD OF THE INVENTION

This invention relates to electromechanical optical modulators and, in particular, to an optical modulator providing enhanced control of stray light.

BACKGROUND OF THE INVENTION

Electromechanical optical modulators (sometimes called MARS modulators) are useful in optical communication systems. A electromechanical optical modulator is basically a Fabry-Perot cavity comprising the air gap between an optical membrane and a substrate. Modulation of reflected light is based on voltage-controlled movement of the membrane in relation to the substrate. Such devices can provide high contrast reflection modulation at rates in excess of several Mbit/sec. They are particularly useful as optical equalizers, switches for wavelength Add/Drop modules and optical cross-connect mirrors. U.S. Pat. No. 5,500,761 issued to K. W. Goosen et al. on Mar. 19, 1996 describes a electromechanical optical modulator useful for power equalization, and modulator having low insertion loss and enhanced operating bandwidth is described in the copending U.S. patent application Ser. No. 08/901,050 filed by K. W. Goosen et al on Jul. 25, 1997 and entitled "Microelectromechanical Modulator Having Enhanced Performance", now U.S. Pat. No. 5,870,221. Both U.S. Pat. No. 5,500,761 and application Ser. No. 08/901,050, now U.S. Pat. No. 5,870,221 are incorporated herein by reference.

Referring to the drawings, FIG. 1 is a schematic cross section of a conventional electromechanical modulator 9 comprising a substrate 10 and a membrane 15 spaced from the substrate to define an air gap 20. The substrate 10 is a conductive material such as doped silicon, and the has a top surface 21 (typically planar) and a back surface 22 (typically parallel or slightly inclined with respect to surface 21). The membrane 15 comprises one or more layers of conductive material such as an overlayer 15a of silicon nitride and an underlayer 15b of polycrystalline silicon. The overlayer has an index of refraction approximately equal to the square root of the substrate refractive index and the underlayer has an index of refraction approximately equal to the substrate refractive index. The thicknesses of layers 15a and 15b are each less than one-quarter of the operating wavelength $\lambda$. The membrane 15 and the substrate 10 are spaced apart by a peripheral support layer 12 of insulating material. Electrodes 1 and 2 permit connection of the membrane 15 and substrate 10, respectively, to the terminals of a bias voltage source 29.

The air gap 20 can be controlled by a bias voltage between the substrate 10 and the membrane 15. Relative reflective maxima are produced when the gap 20 is an odd integer multiple of one-quarter of the operating wavelength $\lambda$. Minima are produced when the gap 20 is 0 or an even integer multiple of $\lambda/4$.

The modulator can employ mirrors of unequal reflectivity to provide broad operating bandwidth with low insertion loss. A high reflectivity membrane provides low insertion loss while a lower reflectivity substrate maintains the broader bandwidth of a low finesse device.

While these devices work well, stray light is a potential difficulty for some applications. Nonreflected light can be transmitted through the gap 20 into the underlying substrate. This light can be useful as a source of signals or information for feedback control, or it can be deleterious as a source of crosstalk through unwanted reflections or scattering. In either case there is a need to control the path of light transmitted into the substrate.

SUMMARY OF THE INVENTION

In accordance with the invention, a electromechanical optical modulator comprising an optical membrane, a substrate and Fabry-Perot air gap between them is provided with an improved structure for controlling light transmitted into the substrate. Specifically, an etched and coated cavity is formed in the backwall of the substrate underlying the air gap to receive transmitted light and redirect it onto controllable paths within the substrate. Advantageously the substrate is silicon, and the cavity is produced by anisotropic etching.

BRIEF DESCRIPTION OF THE DRAWINGS

The nature, advantages and various additional features of the invention will appear more fully upon consideration of the illustrative embodiments to be described in detail in connection with the accompanying drawings.

It is to be understood that these drawings are for purposes of illustrating the concepts of the invention and are not to scale.

DETAILED DESCRIPTION

Figure 1:
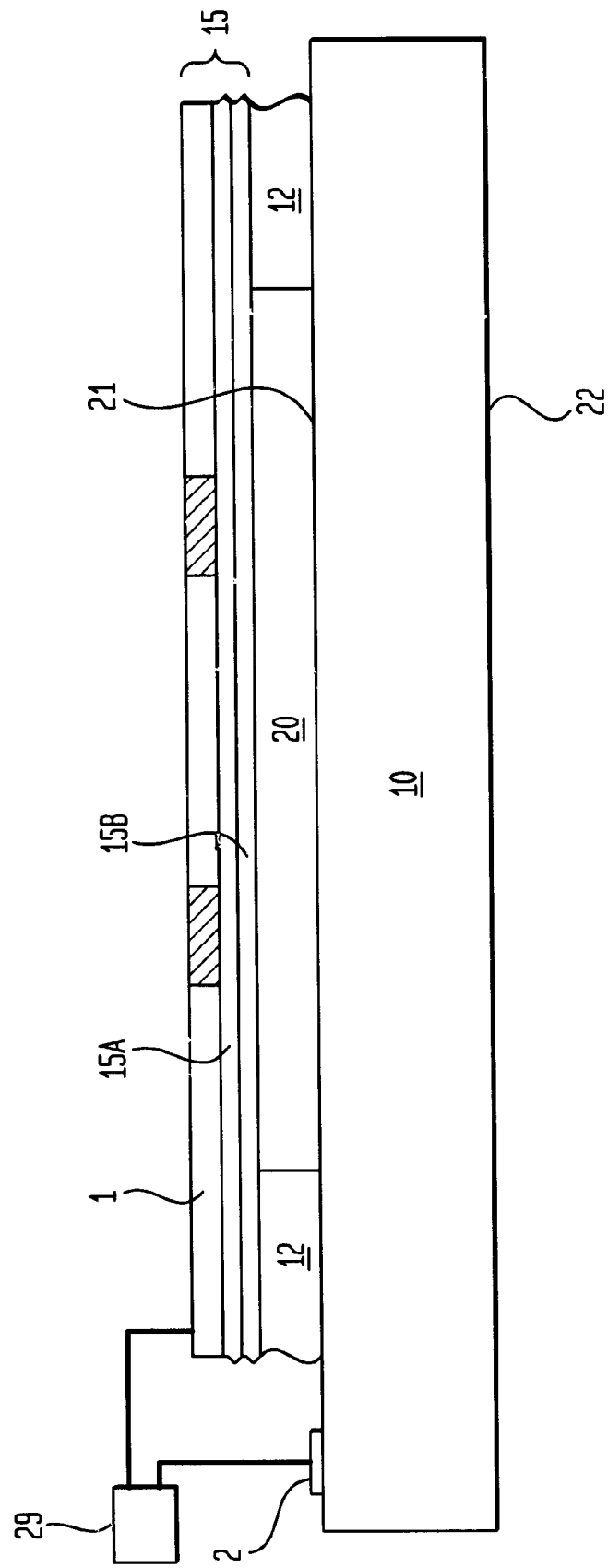
FIG. 1 is a schematic cross section of a conventional electromechanical optical modulator.
Figure 2:
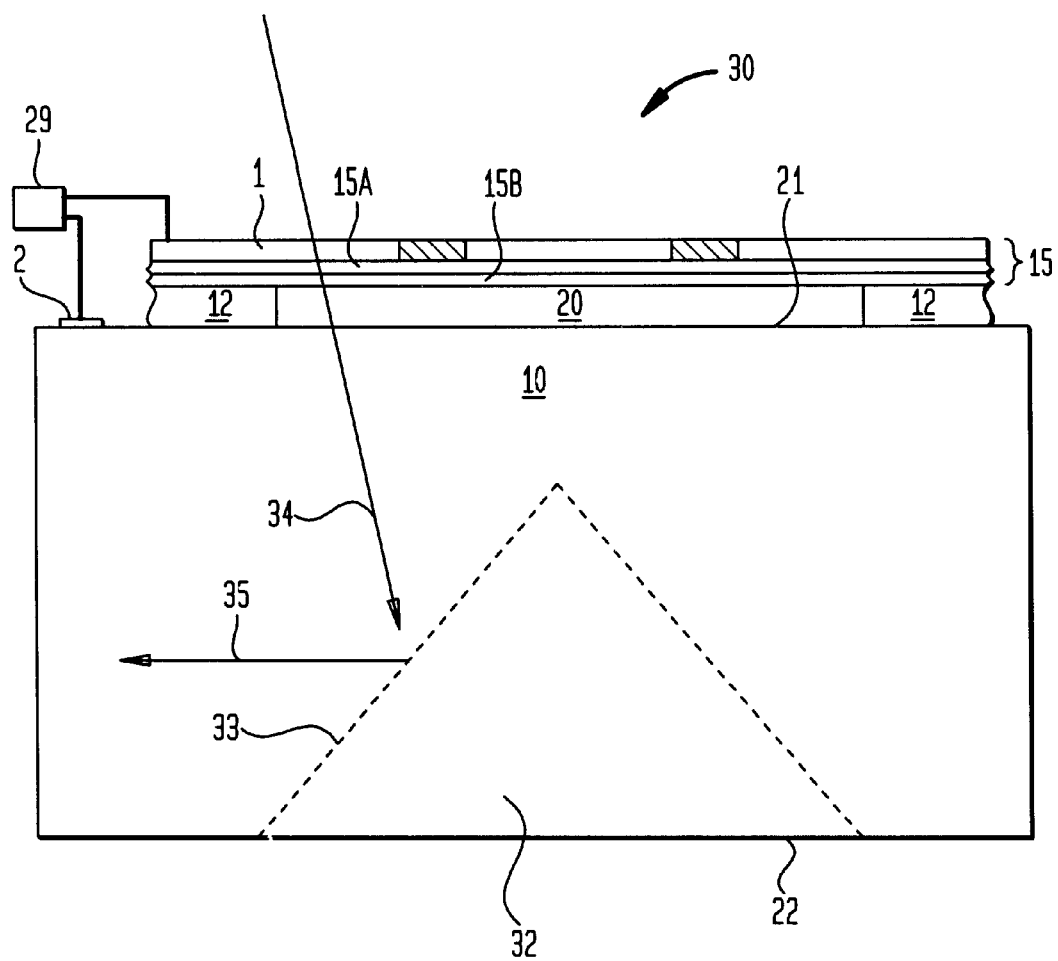
FIG. 2 schematically illustrates a electromechanical optical modulator providing stray light control.

Referring to the drawings, FIG. 2 schematically illustrates an improved electromechanical optical modulator 30 similar to the conventional modulator described in connection with FIG. 1 except that the back surface 22 of substrate 10 is provided with a cavity 32 having a reflective surface 33. The reflective surface 33 is oriented to reflect light 34 transmitted through the air gap into substrate 10 onto a controlled path 35 within the substrate. The path 35 is substantially parallel (0°–20° inclination) in relation to the top surface 21.

The cavity 32 is located in the region of the substrate 10 underlying the air gap 20 and is preferably in the form of a V-groove extending under the central portion of cavity 20. It is contemplated that a plurality of modulators 30 may be fabricated on a single substrate in a linear array, and a single V-groove can extend under all of them. Alternatively, the cavity can be in the shape of a pyramid or a truncated pyramid. The reflective surface 33 of the cavity 32 is preferably a smooth, planar surface and its reflectivity can be enhanced by appropriate coating such as a thin film of metal. The slope of the surface 33 in relation to the transmitted light is chosen to reflect the transmitted light within the substrate along a path substantially parallel to the top surface 21. This path avoids the unpredictable effects of normal incidence reflection from surfaces 21 and 22 with ensuing multiple reflections. The light is typically reflected at an angle inclined 0–20° with respect to the top surface 21. This means the surface 33 is typically inclined with respect to top surface 21 at an angle in the range 40°–60°.

A convenient way of fabricating the cavity 32 is to use a crystalline silicon substrate and an anisotropic (crystallographic) etchant to preferentially etch the cavity 32 along crystalline planes angled from the backside surface 31. Advantageously the substrate is (100) oriented crystalline silicon having parallel top and back surfaces which can be crystallographically etched by ethylene-diamine-pyrocatechol (EDP) into V-grooves intersecting the major surfaces at an angle of about 54°. The walls are smooth (111) planes of the silicon.

Typically the modulator 30 is fabricated on the silicon substrate in the manner described in the above-cited Goosen et al. patent. The backside of the substrate is photolithographically etched to form the cavity 32 and the reflective walls 33. The walls are then coated with a thin film of reflective metal such as aluminum.

Figure 3:
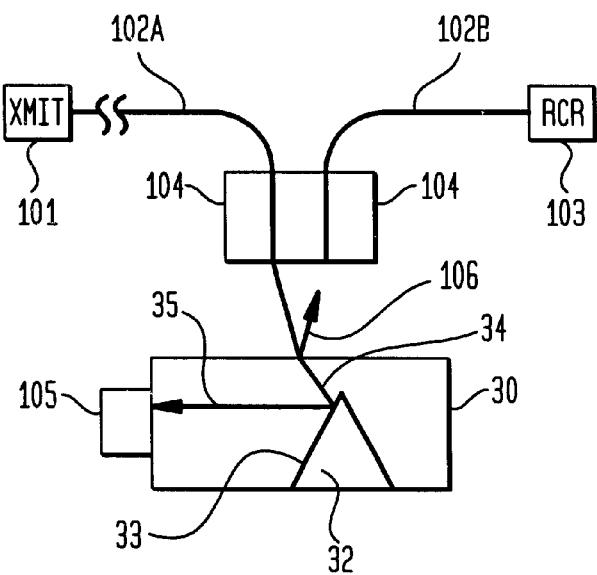
FIG. 3 illustrates an application of the modulator of FIG. 2.

FIG. 3 schematically illustrates an optical communication system 100 employing the modulator 30. In essence, the system 100 comprises an optical transmitter 101 for launching optical signals into a first optical transmission fiber segment 102A. Light 106 from segment 102A may reflect from modulator 30 into a second transmission fiber segment 102B and is ultimately transmitted to an optical receiver 103. Conveniently ends of fiber segments 102A and 102B are disposed in a dual-fiber ferrule photonics package 104 as described in co-pending U.S. patent application Ser. No. 08/688,178 filed by Feuer et al. on Jul. 26, 1996 and assigned to applicants' assignee, now abandoned. This application is incorporated herein by reference.

Some of the light 34 from segment 102A is not reflected and is transmitted into the substrate 10 of modulator 30. This light is reflected by the walls 33 of cavity 32 along a controlled path 35 to a detector 105 which can be a light intensity detector for feedback control or an optical receiver for receiving a tapped or dropped optical signal.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In an electromechanical optical modulator comprising an electrically conductive substrate having a top surface and a back surface, an electrically conductive optical membrane spaced from the top surface of the substrate to form an air gap between the membrane and the substrate, and a voltage source for applying a bias voltage between the membrane and the substrate to vary the distance between the membrane and the substrate and thereby vary the reflectivity of the modulator;

the improvement wherein the back surface of the substrate underlying the air gap includes a cavity having a reflective wall, the reflective wall positioned for receiving light transmitted into the substrate from the air gap and reflecting the transmitted light within the substrate along a path substantially parallel to the top surface.

2. The improved electromechanical optical modulator of claim 1 wherein the substrate has a planar top surface and the cavity is a v-groove having reflective planar walls inclined with respect to the top surface at angles in the range 40°–60°.

3. The improved electromechanical optical modulator of claim 1 wherein the substrate is crystalline silicon and the cavity is a planar surfaced cavity formed by anisotropic etching of the crystalline silicon.

4. The improved electromechanical optical modulator of claim 1 wherein the reflective wall is positioned and oriented for reflecting transmitted light over a path inclined at an angle of 0°–20° in relation to the top surface.

5. The improved electromechanical optical modulator of claim 1 further comprising an optical detector positioned for receiving light reflected by the reflective wall.

* * * * *